United States Patent
Kuriloff et al.

(10) Patent No.: US 11,668,891 B1
(45) Date of Patent: Jun. 6, 2023

(54) SYSTEMS AND METHODS FOR INSTALLING FIBER OPTIC CABLE ONTO A POWERLINE CONDUCTOR

(71) Applicant: Meta Platforms, Inc., Menlo Park, CA (US)

(72) Inventors: Jonathan M. Kuriloff, Saint James, NY (US); Benjamin Lagosz-Sinclair, Tuxedo Park, NY (US); G. Gregory Penza, Old Field, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/497,049

(22) Filed: Oct. 8, 2021

Related U.S. Application Data

(63) Continuation of application No. 16/406,384, filed on May 8, 2019, now Pat. No. 11,169,351.

(60) Provisional application No. 62/793,631, filed on Jan. 17, 2019.

(51) Int. Cl.
 *G02B 6/48* (2006.01)
 *H01B 9/00* (2006.01)
 *G02B 6/44* (2006.01)

(52) U.S. Cl.
 CPC .............. *G02B 6/486* (2013.01); *G02B 6/442* (2013.01); *H01B 9/005* (2013.01)

(58) Field of Classification Search
 CPC ......... H02G 7/10; G02B 6/4422; G02B 6/486
 See application file for complete search history.

(56) References Cited

U.S. PATENT DOCUMENTS

| | | | |
|---|---|---|---|
| 2,402,172 A * | 6/1946 | Macy | G02B 6/486 254/134.3 CL |
| 4,019,715 A | 4/1977 | Vugrek | |
| 4,715,582 A | 12/1987 | Ikeda et al. | |
| 4,833,871 A | 5/1989 | Ogawa et al. | |
| 5,111,709 A | 5/1992 | Torii et al. | |
| 5,727,373 A | 3/1998 | Appleford et al. | |
| 6,000,209 A | 12/1999 | Ito et al. | |

(Continued)

FOREIGN PATENT DOCUMENTS

| | | |
|---|---|---|
| CN | 107735346 A | 2/2018 |
| DE | 3702781 A1 | 8/1988 |

(Continued)

OTHER PUBLICATIONS

AFL, "Fiber Optic Cable," SkyWrap, 2002, pp. 59-60.

(Continued)

*Primary Examiner* — Charlie Y Peng
(74) *Attorney, Agent, or Firm* — Greenberg Traurig, LLP

(57) ABSTRACT

The disclosed system may include (1) a drive subsystem that translates along a powerline conductor, (2) a rotation subsystem that rotates a segment of fiber optic cable about the powerline conductor while the drive subsystem translates along the powerline conductor such that the segment of fiber optic cable is wrapped helically about the powerline conductor, and (3) an extension subsystem that (a) mechanically couples the rotation subsystem to the drive subsystem, and (b) selectively extends the rotation subsystem away from the drive subsystem and the powerline conductor to avoid obstacles along the powerline conductor. Various other systems and methods are also disclosed.

20 Claims, 13 Drawing Sheets

(56) References Cited

U.S. PATENT DOCUMENTS

| | | | |
|---|---|---|---|
| 6,032,448 A * | 3/2000 | Baker | G02B 6/486 57/18 |
| 6,032,449 A | 3/2000 | Einsle et al. | |
| 6,813,422 B1 | 11/2004 | Krishnamurthy et al. | |
| 8,831,394 B2 | 9/2014 | Kimbrell et al. | |
| 8,919,092 B2 | 12/2014 | Figenschou et al. | |
| 9,051,153 B2 | 6/2015 | Lichoulas et al. | |
| 2003/0006332 A1 | 1/2003 | Appleby et al. | |
| 2007/0009215 A1 | 1/2007 | Sales Casals | |
| 2017/0176703 A1 | 6/2017 | Baker et al. | |
| 2018/0074214 A1 | 3/2018 | Magne et al. | |

FOREIGN PATENT DOCUMENTS

| | | | | |
|---|---|---|---|---|
| GB | 2173471 A | * | 10/1986 | B65H 54/10 |
| RU | 2606242 C2 | | 1/2017 | |
| WO | 9513619 A1 | | 5/1995 | |
| WO | 9632661 A1 | | 10/1996 | |

OTHER PUBLICATIONS

AFL, "Frequently Asked Questions," SkyWrap Information, 2009, pp. 1-2.
AFL, "Lightweight Retro-fit Fibre Optic Cable," AccessWrap, 2012, 1 page.
International Search Report and Written Opinion for International Application No. PCT/US2020/031379, dated Jul. 23, 2020, 10 pages.
Office Action dated Feb. 10, 2023 for Chinese Application No. 202080031536.3, filed Oct. 26, 2021, 10 pages.

* cited by examiner

SYSTEMS AND METHODS FOR INSTALLING FIBER OPTIC CABLE ONTO A POWERLINE CONDUCTOR

CROSS REFERENCE TO RELATED APPLICATION

This application is a continuation of U.S. application Ser. No. 16/406,384 filed 8 May 2019 and claims the benefit of U.S. Provisional Application No. 62/793,631, filed 17 Jan. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
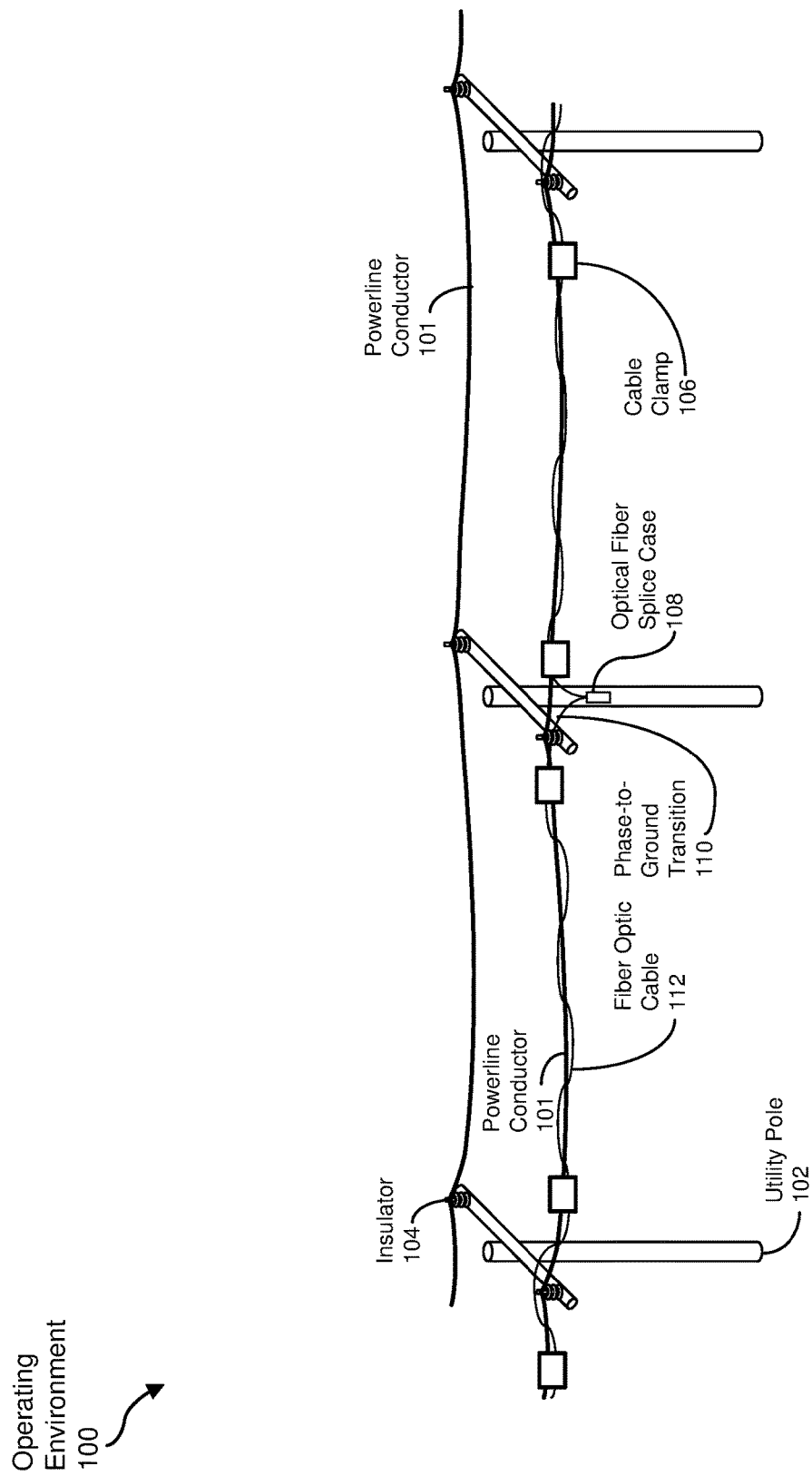
FIG. 1 is a graphical representation of an exemplary operating environment, including a powerline conductor in which various exemplary embodiments may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a wrapping subsystem of the device helically wraps the fiber optic cable about the conductor.

While translating along a powerline conductor during fiber optic cable installation, conventional robotic devices may encounter one or more obstacles (e.g., insulators, taps, and the like), especially along powerline conductors of electrical distribution systems. In such cases, human operators may intervene to temporarily remove and then reattach the robotic device to allow the robotic device to continue to install the fiber optic cable on the powerline conductor beyond the encountered obstacle.

The present disclosure is generally directed to robotic systems and associated methods for installing fiber optical cable on a powerline conductor. As will be explained in greater detail below, embodiments of the present disclosure may facilitate obstacle avoidance during the powerline conductor, thus potentially reducing the amount of human intervention required to allow the robotic device to install the fiber optic cable.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
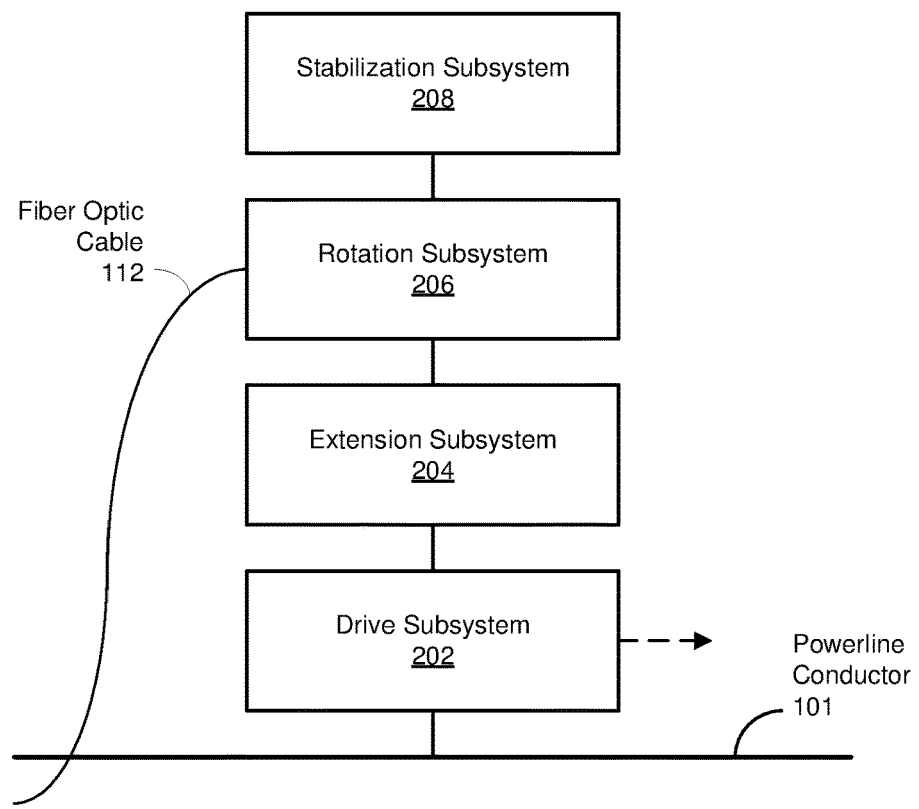
FIG. 2 is a block diagram of an exemplary robotic system that may install a segment of fiber optic cable about a powerline conductor.
Figure 3:
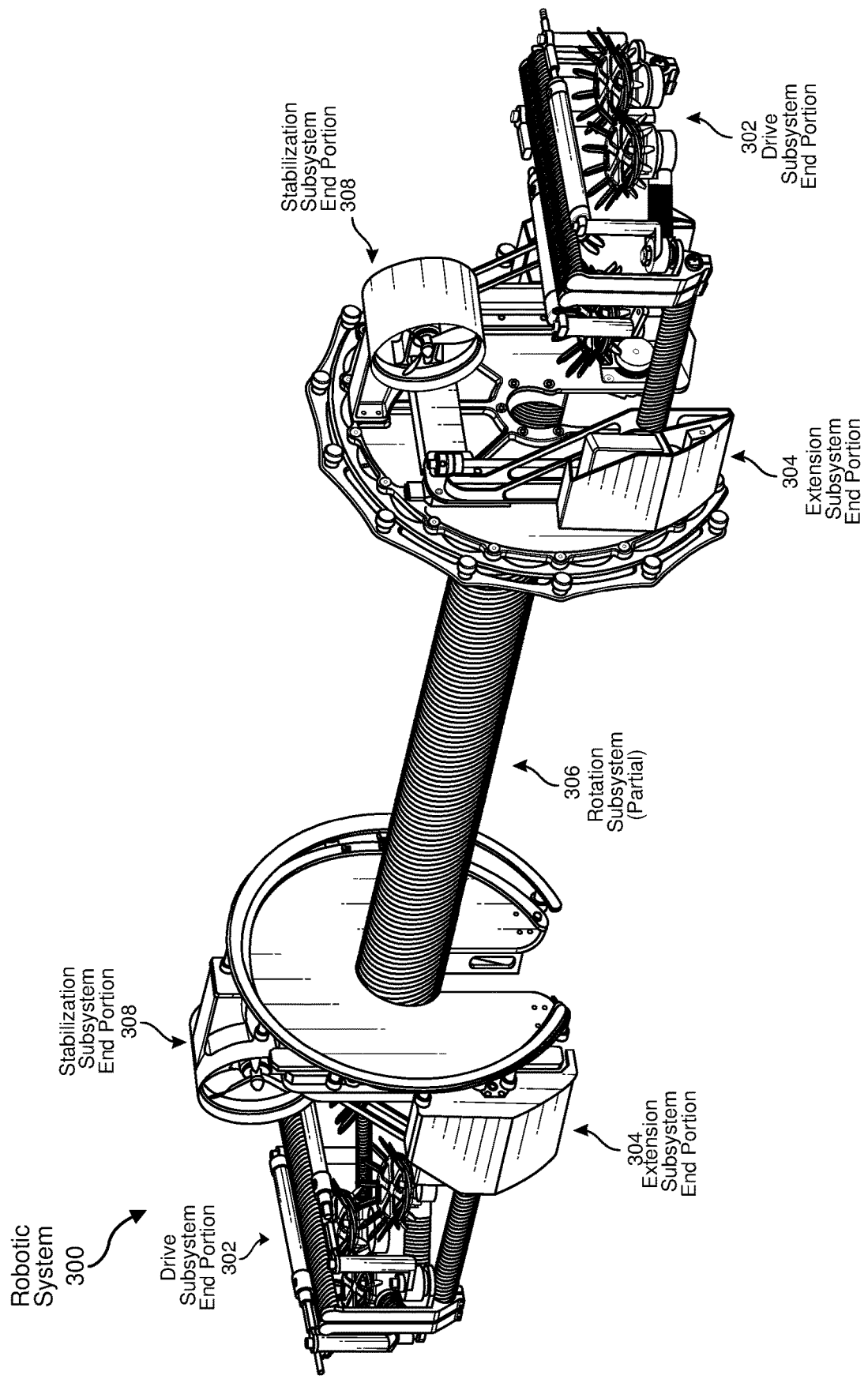
FIG. 3 is a perspective view of a portion of an exemplary robotic system that may install a segment of fiber optic cable about a powerline conductor.

The following will provide, with reference to FIGS. 1-13, detailed descriptions of systems and methods for installing fiber optic cable on a powerline conductor. A brief description of an exemplary operating environment in which various embodiments of systems and methods for installing fiber optic cable may operate is provided in connection with FIG. 1. Exemplary robotic systems for installing fiber optic cable are discussed in conjunctions with FIGS. 2 and 3. In association with FIGS. 4-11, various subsystems of the exemplary robotic systems of FIGS. 2 and 3 are described in detail. An exemplary method of installing fiber optic cable onto a powerline conductor is discussed in connection with FIG. 12. Another exemplary system including software modules for performing various operations is discussed in conjunction with FIG. 13.

FIG. 1 is a graphical representation of an exemplary operating environment 100 in which various embodiments disclosed herein may be utilized. As depicted in the example of FIG. 1, operating environment 100 may include an electrical power transmission or distribution system having a plurality of utility poles 102 carrying multiple powerline conductors 101. Examples of powerline conductors 101 may include stranded cables, but powerline conductors 101 are not restricted to such embodiments. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is a fiber optic cable 112 aligned with, and mechanically coupled to, powerline conductor 101. In some embodiments, fiber optic cable 112 may be helically wrapped about powerline conductor 101, such as by way of a human-powered or electrically-powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or may alternate between two or three different phases, such as at phase-to-ground transitions 114 at utility poles 102. Moreover, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. In some examples, such as that shown in FIG. 1, optical fiber splice case 108 may be attached to, or positioned on, a utility pole 102. In some examples, such as that depicted in FIG. 1, optical fiber splice case 108 may be mounted on a lower portion of utility pole 102 (e.g., in a lower-voltage section at a safe distance away from higher-voltage powerline conductor 101) to facilitate installation of optical fiber splice case 108. Additionally, in some embodiments, a phase-to-ground transition 114 may be coupled with each length of fiber optic cable 112 to be interconnected to provide electrical isolation from powerline conductor 101. However, other locations for optical fiber splice case 108 may also be possible.

FIG. 2 is a block diagram of an exemplary robotic system 200 for installing fiber optic cable (e.g., fiber optic cable 112) onto a powerline conductor (e.g., powerline conductor 101). As depicted in FIG. 2, robotic system 200 may include a drive subsystem 202, an extension subsystem 204, a rotation subsystem 206, and/or a stabilization subsystem 208. In some embodiments, FIG. 2 provides a general representation of how subsystems 202-208 are mechanically coupled to each other, although other examples may possess alternative connection arrangements. In some embodiments, drive subsystem 202 may translate along powerline conductor 101. Also, in some examples, extension subsystem 204 may mechanically couple rotation subsystem 206 to drive subsystem 202 and selectively extend rotation subsystem 206 (and possibly stabilization subsystem 208, when included in robotic system 200) away from drive subsystem 202 and/or powerline conductor 101 to avoid obstacles (e.g., insulators 104) along powerline conductor 101. Rotation subsystem 206, in some examples, may rotate a segment of fiber optic cable 112 about powerline conductor 101 while drive subsystem 202 translates along powerline conductor 101 such that the segment of fiber optic cable 112 is wrapped helically about powerline conductor 101.

Moreover, in some embodiments, stabilization subsystem 208, which may be coupled to rotation subsystem 206, may maintain a desired position of rotation subsystem 206 and/or other portions of robotic system 200 relative to powerline conductor 101. As described in greater detail below, that position may be directly above powerline conductor 101. Further, in some examples, stabilization subsystem 208 may be employed at least during times when extension subsystem 204 is extending rotation subsystem 206 away from powerline conductor 101.

FIG. 3 is a perspective view of various portions of a robotic system 300, which may serve as an embodiment of robotic system 200 of FIG. 2, as described above. As illustrated in FIG. 3, drive subsystem 202 may include separate drive subsystem end portions 302, and extension subsystem 204 may include separate extension subsystem end portions 304 mechanically coupled to corresponding drive subsystem end portions 302. In some embodiments, robotic system 300 may include a first (e.g., leading or fore) end and a second (e.g., trailing or aft) end that may be determined by a direction in which robotic system 300 translates along powerline conductor 101, with each end corresponding to a drive subsystem end portion 302 and an extension subsystem end portion 304. Additionally, rotation subsystem 306, or some portion thereof, may be coupled at opposing ends to extension subsystem end portions 304. Further, stabilization subsystem 208 may include separate stabilization subsystem end portions 308, each of which may be coupled to corresponding ends of rotation subsystem 306.

In operation, as at least one drive subsystem end portion 302 propels robotic system 300 along powerline conductor 101 (not shown in FIG. 3), rotation subsystem 306 may rotate about its longitudinal axis that substantially aligns with powerline conductor 101 while paying out a segment of fiber optic cable 112 (also not shown in FIG. 3), resulting in the segment of fiber optic cable 112 being helically wrapped about powerline conductor 101. In some examples, each drive subsystem end portion 302 may engage (e.g., clamp) powerline conductor 101 at two or more points while translating along powerline conductor 101. Additionally, in some embodiments, upon encountering an obstacle (e.g., insulator 104), each drive subsystem end portion 302 may selectively release powerline conductor 101 at least at one point while selectively continuing to clamp powerline conductor 101 at least at one other point, thus facilitating avoidance of the obstacle while continuing to engage powerline conductor 101 at each drive subsystem end portion 302.

Moreover, to further facilitate obstacle avoidance, extension subsystem end portions 304 may extend rotation subsystem 306 away from drive subsystem end portions 302 and/or powerline conductor 101 (e.g., upward) as drive subsystem end portions 304 translate along powerline conductor 101, thus allowing rotation subsystem 306 to pass over the obstacle. In addition, in some examples, one or both stabilization subsystem end portions 308 may include a stabilizing component (e.g., a thruster) to stabilize the position of rotation subsystem 306, and thus robotic system 300, such as by maintaining the current rotational position of robotic system 300 relative to powerline conductor 101 (e.g., in the orientation illustrated in FIG. 3). In some embodiments, stabilization subsystem end portions 308 may provide stabilization only while extension subsystem end portions 304 extend rotation subsystem 306 upward or may provide such stabilization at other times as well.

Figure 4:
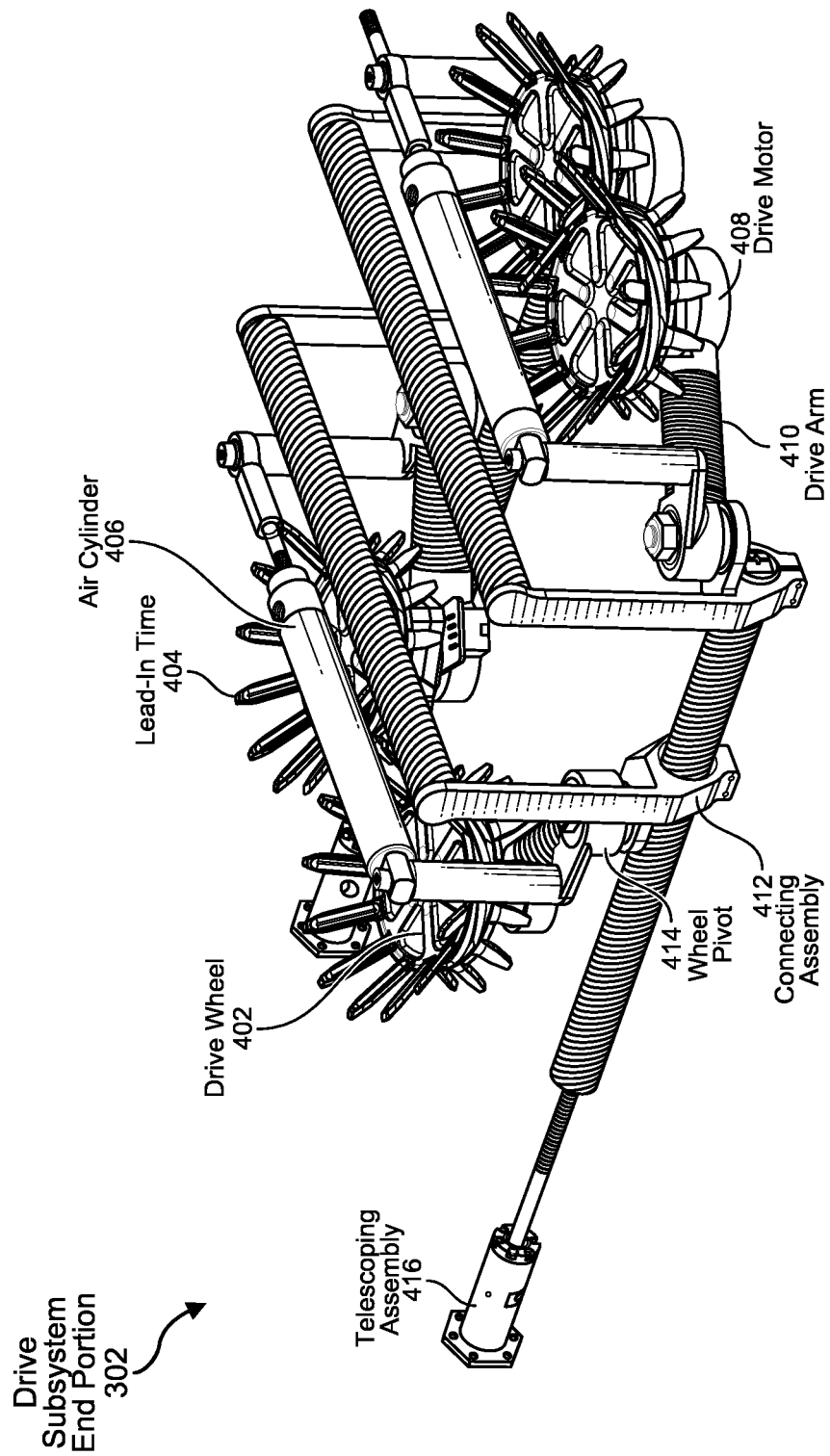
FIG. 4 is a perspective view of an exemplary drive subsystem end portion employable in the robotic systems of FIGS. 2 and 3.

FIG. 4 is a perspective view of an exemplary drive subsystem end portion 302. As shown, drive subsystem end portion 302 may provide two telescoping assemblies 416 that attach drive subsystem end portion 302 to extension subsystem end portion 304 (not shown in FIG. 4). In some embodiments, telescoping assembly 416 may facilitate selectable positioning (e.g., via motor-driven screw drive) of drive subsystem end portion 302 relative to extension subsystem end portion 304. In other examples, the positioning of drive subsystem end portion 302 relative to extension subsystem end portion 304 may remain constant or static.

Mechanically coupled to telescoping assembly 416 may be two cable engaging assemblies, each of which may include a pair of engaging components (e.g., drive wheels 402), where each pair of engaging components selectively clamps or grips powerline conductor 101 therebetween. While drive wheels 402 are employed in the embodiment of FIG. 4, other types of engaging components (e.g., rotating treads) may be used in other embodiments. Additionally, to translate drive subsystem end portion 302 along powerline conductor 101, one or more drive motors 408, possibly along with gearing and/or other mechanical components, may be employed to drive corresponding drive wheels 402 (e.g., by rotating each of a pair of drive wheels 402 about a corresponding vertical axis in opposing directions).

In some embodiments, each pair of drive wheels 402 may be coupled to telescoping assembly 416 by way of a corresponding connecting assembly 412. In some examples, connecting assembly 412 may by coupled to each telescoping assembly 416 to provide structural stability to drive subsystem end portion 302. Additionally, each connecting assembly 412 may be coupled to an end of each of a pair of drive arms 410 by way of associated wheel pivots 414, thus defining a vertical axis about which drive wheels 402 may be pivoted in a horizontal plane. Also, as depicted in FIG. 4, each drive arm 410 may be coupled to a corresponding force generator (e.g., an air cylinder 406).

In operation, air cylinder 406 may be operated to selectively force drive wheels 402 of the associated drive wheel pair together via drive arms 410 to clamp powerline conductor 101 (not shown in FIG. 4), or to selectively separate drive wheels 402 to release powerline conductor 101. In at least some embodiments, air cylinders 406 of drive subsystem end portion 302 may be operated independently so that each pair of drive wheels 402 may selectively clamp powerline conductor 101 independently, thus facilitating obstacle avoidance, as described above. Further, in the embodiment of FIG. 4, each drive wheel 402 may include lead-in tines 404 that guide drive wheels 402 onto powerline conductor 101 as drive wheels 402 are clamped onto powerline conductor 101.

More specifically, as drive subsystem end portion 302 approaches an obstacle, a leading pair of drive wheels 402 may be separated so that the obstacle may pass therebetween. As the drive subsystem end portion 302 continues along powerline conductor 101, the leading pair of drive wheels 402 may re-clamp powerline conductor 101, such as when the obstacle is located between the leading pair and a trailing pair of drive wheels 402. Thereafter, the trailing pair of drive wheels 402 may be separated to allow the obstacle to pass therebetween. Once the trailing pair of drive wheels 402 clear the obstacle, the trailing pair may re-clamp powerline conductor 101. At this point, extension subsystem end portions 304 may extend rotation subsystem 306 to allow the obstacle to pass underneath rotation subsystem 306 as drive subsystem end portions 302 continue to translate robotic system 300 along powerline conductor 101. After rotation subsystem 306 clears the obstacle, extension subsystem end portions 304 may lower rotation subsystem 306 to its original position, after which the pairs of drives wheels 402 of the remaining drive subsystem end portion 302 may follow a similar clamping, releasing, and re-clamping process to that described above to complete navigation of the obstacle by robotic system 300.

While particular components (e.g., drive wheels 402, drive arms 410, air cylinders 406, and so on) are employed in drive subsystem end portion 302 of FIG. 4, other components in varying configurations may be used in drive subsystem end portion 302 while providing similar functionality (e.g., translation along powerline conductor 101, selective clamping and releasing of powerline conductor 101, and the like).

Moreover, in some embodiments, additional or different components and associated configurations may be included in drive subsystem end portion 302 to facilitate enhanced adaptability to a variety of circumstances presented by operating environment 100. For example, drive subsystem end portion 302 may incorporate a mechanism to pitch (e.g., angle up and/or down) and/or yaw (e.g., angle left and/or right) all or a portion of subsystem end portion 302 relative to corresponding extension subsystem end portion 304 (e.g., to adapt to significant changes in direction of powerline conductor 101, such as at insulator 104).

Further, in some embodiments, robotic system 300 may include one or more sensors for detecting obstacles such that drive subsystem end portion 302 may perform its obstacle avoidance operations in response to data from those sensors. In other examples, robotic system 300 may include communication circuitry (e.g., a wireless transceiver) such that a human operator may initiate and/or control the obstacle avoidance operations (e.g., by way of commands to motors, valves, and the like to operate drive wheels 402, drive arms 410, and so on).

Figure 5:
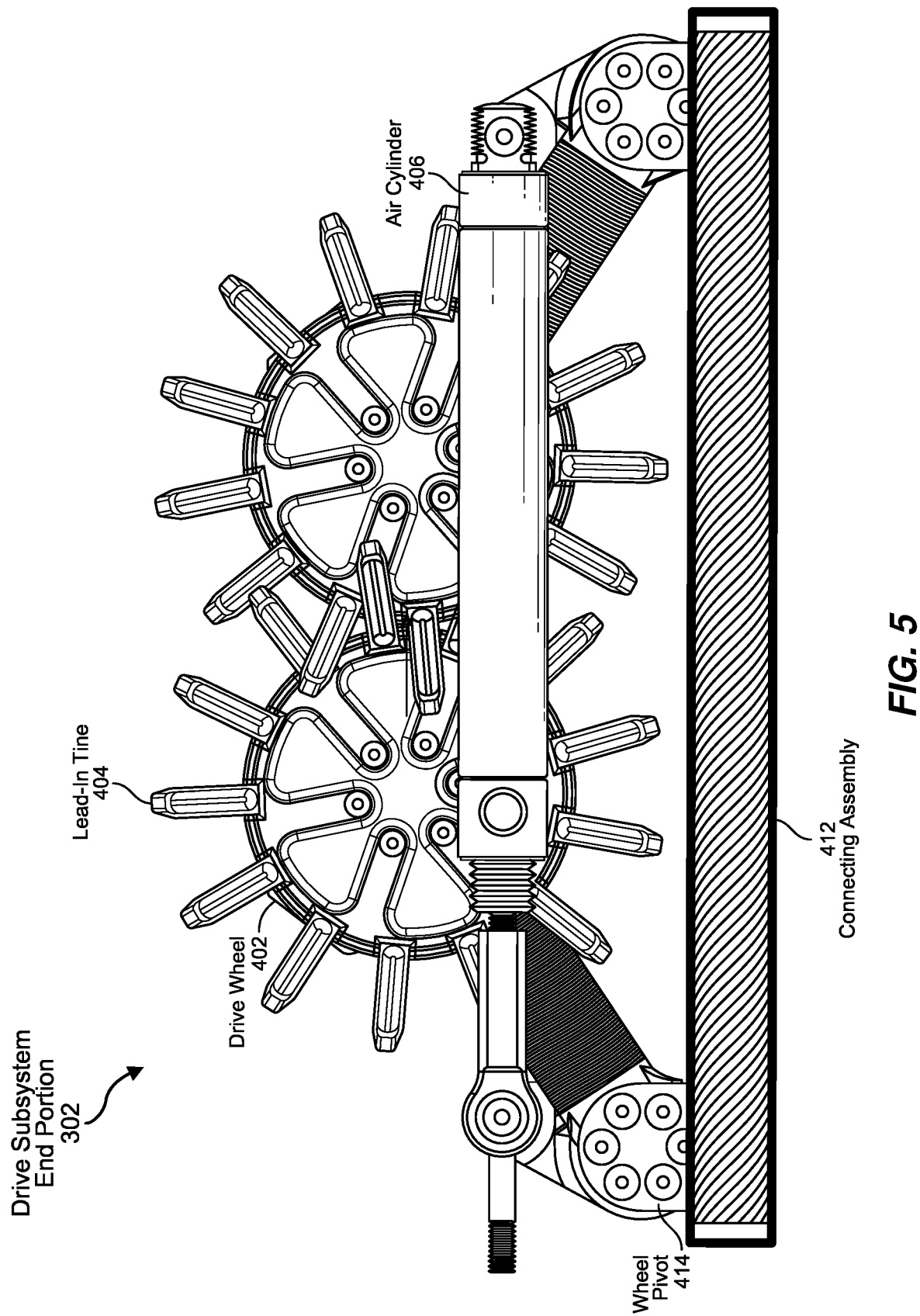
FIG. 5 is a top view of an exemplary section of the drive subsystem end portion of FIG. 4 in a clamping position.

FIG. 5 is a top view of a pair of drive wheels 402 in a clamped position (e.g., clamping powerline conductor 101) in response to air cylinder 406 rotating drive arms 410 together about corresponding wheel pivots 414. In some embodiments, in the clamped position, lead-in tines 404 of drive wheels 402 are interleaved as drive wheels 402 rotate, thus facilitating guiding drive wheels 402 along powerline conductor 101. In some examples, air cylinder 406, by providing a force clamping drive wheels 402 toward each other, may provide a relatively high level of compliance, whereby the clamping force delivered via drive wheels 402 may be applied consistently in locations in which powerline conductor 101 changes directions, such as at insulators 104 or other obstacles. Consequently, using air cylinder 406 or a similar force-generating mechanism, precise horizontal positioning of each drive wheel 402 individually relative to powerline conductor 101 may be unnecessary.

Figure 6:
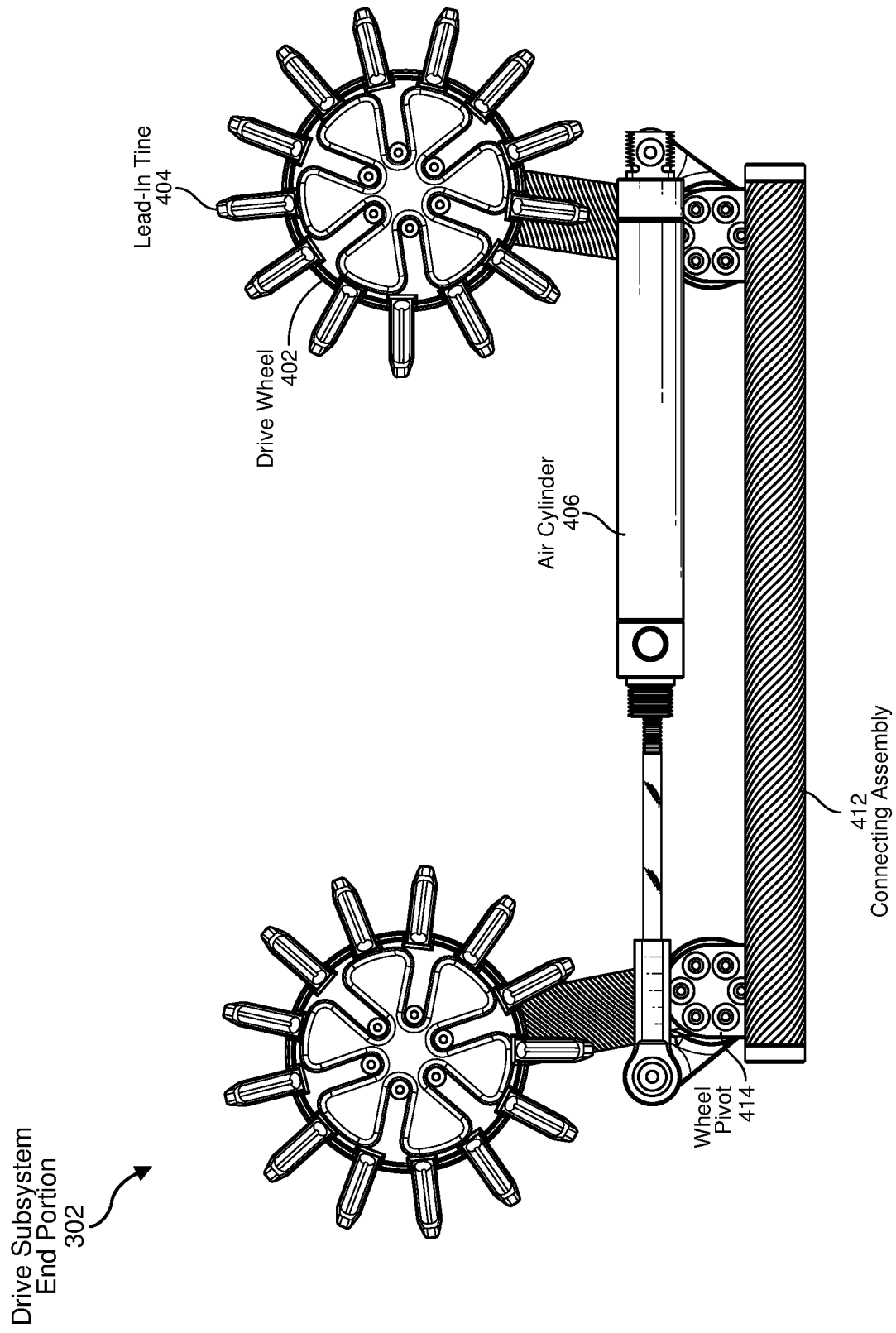
FIG. 6 is a top view of the section of the drive subsystem end portion of FIG. 4 in a releasing position.

FIG. 6 is a top view of a pair of drive wheels 402 in a released or unengaged position based on air cylinder 406 providing a separating force via wheel pivots 414 and drive arms 410. As discussed above, separating drive wheels 402 may allow an obstacle along powerline conductor 101 to pass therebetween. In at least some examples, one pair of drive wheels 402 may be separated (e.g., to avoid an obstacle) while another pair of drive wheels 402 of drive subsystem end portion 302 may be clamping powerline conductor 101 to maintain stable contact of drive subsystem end portion 302 with powerline conductor 101, and to facilitate movement of drive subsystem end portion 302 along powerline conductor 101.

Figure 7:
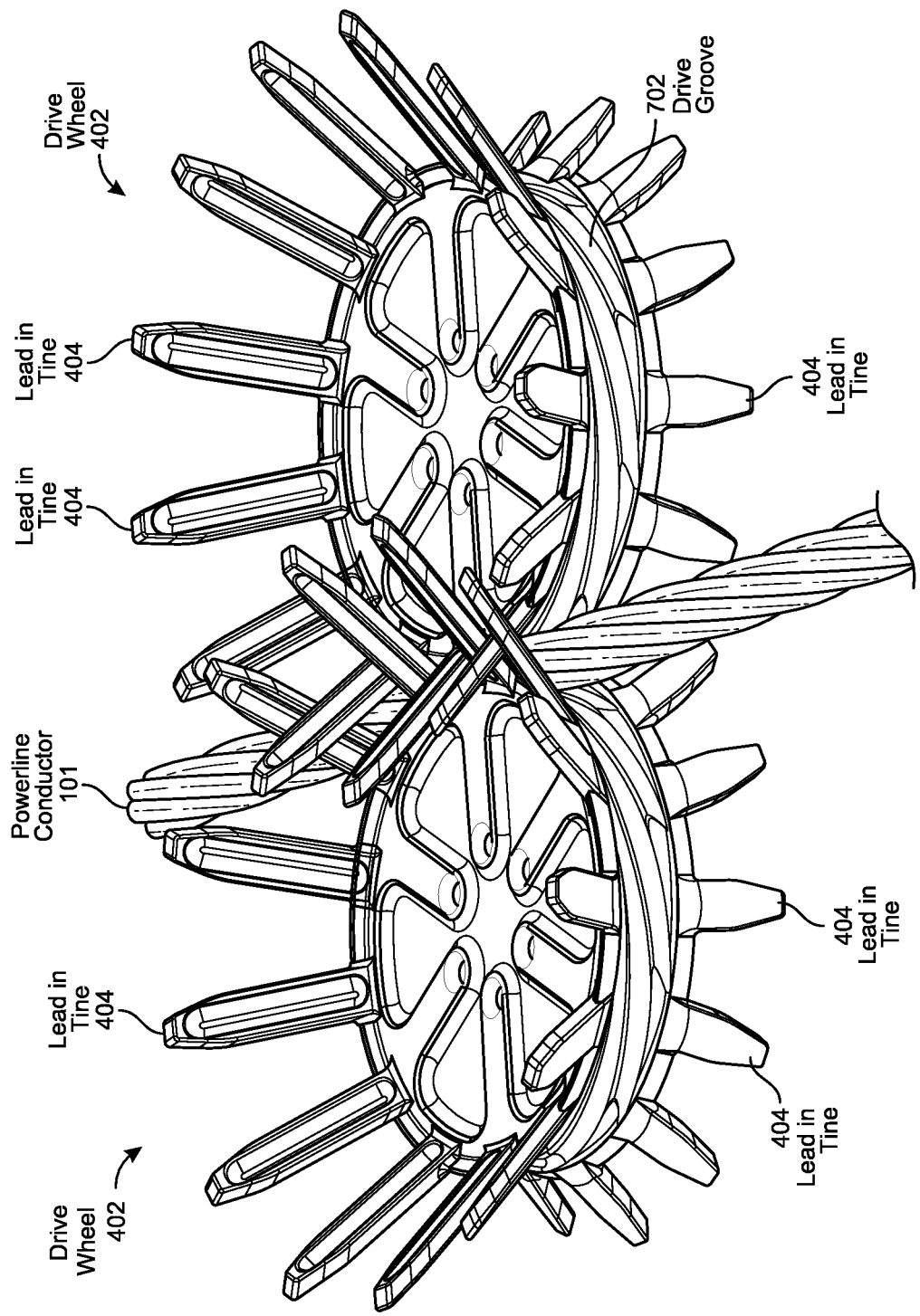
FIG. 7 is a perspective view of exemplary drive wheels of the section of the drive subsystem end portion of FIG. 4 in the clamping position.

FIG. 7 is a perspective view of a pair of drive wheels 402 clamping powerline conductor 101 therebetween. As shown in the example of FIG. 7, powerline conductor 101 may be an aluminum-conductor steel-reinforced (ACSR) cable. In some examples, the engaging edge surface of each drive wheel 402 may define drive grooves 702 that mesh with the helical surface ridges of powerline conductor 101, thus potentially increasing grip strength by drive wheels 402.

As indicated above, in some embodiments, drive wheels 402 may further include lead-in features (e.g., lead-in tines 404) to ensure alignment between drive wheels 402 and powerline conductor 101 when drive wheels 402 are initially clamped to powerline conductor 101, as well as while drive wheels 402 rotate along powerline conductor 101. In this particular example, lead-in tines 404 may protrude outward at an angle from the edges of drive wheels 402 in a circular pattern such that lead-in tines 404 of opposing drive wheels 402 interleave as drive wheels 402 rotate.

In some examples, lead-in tines 404 may be designed to capture powerline conductor 101 and to prevent drive wheels 402 from slipping off powerline conductor 101 vertically as they react to the weight of robotic system 300. Additionally, lead-in tines 404 or other similar lead-in features could enable drive wheels 402 to pass over obstacles (e.g., cylindrical obstacles, such as clamps 106, tie wraps, or cable splices) while maintaining vertical alignment between drive wheels 402 and powerline conductor 101. While lead-in tines 404 are depicted in FIGS. 3-7 as being substantially linear with relatively sharp features, other examples of lead-in tines 404 may include more rounded features to reduce or eliminate sharp corners, which may serve to reduce the possibility of corona discharge in some high-voltage environments, such as operating environment 100 of FIG. 1.

Figure 8:
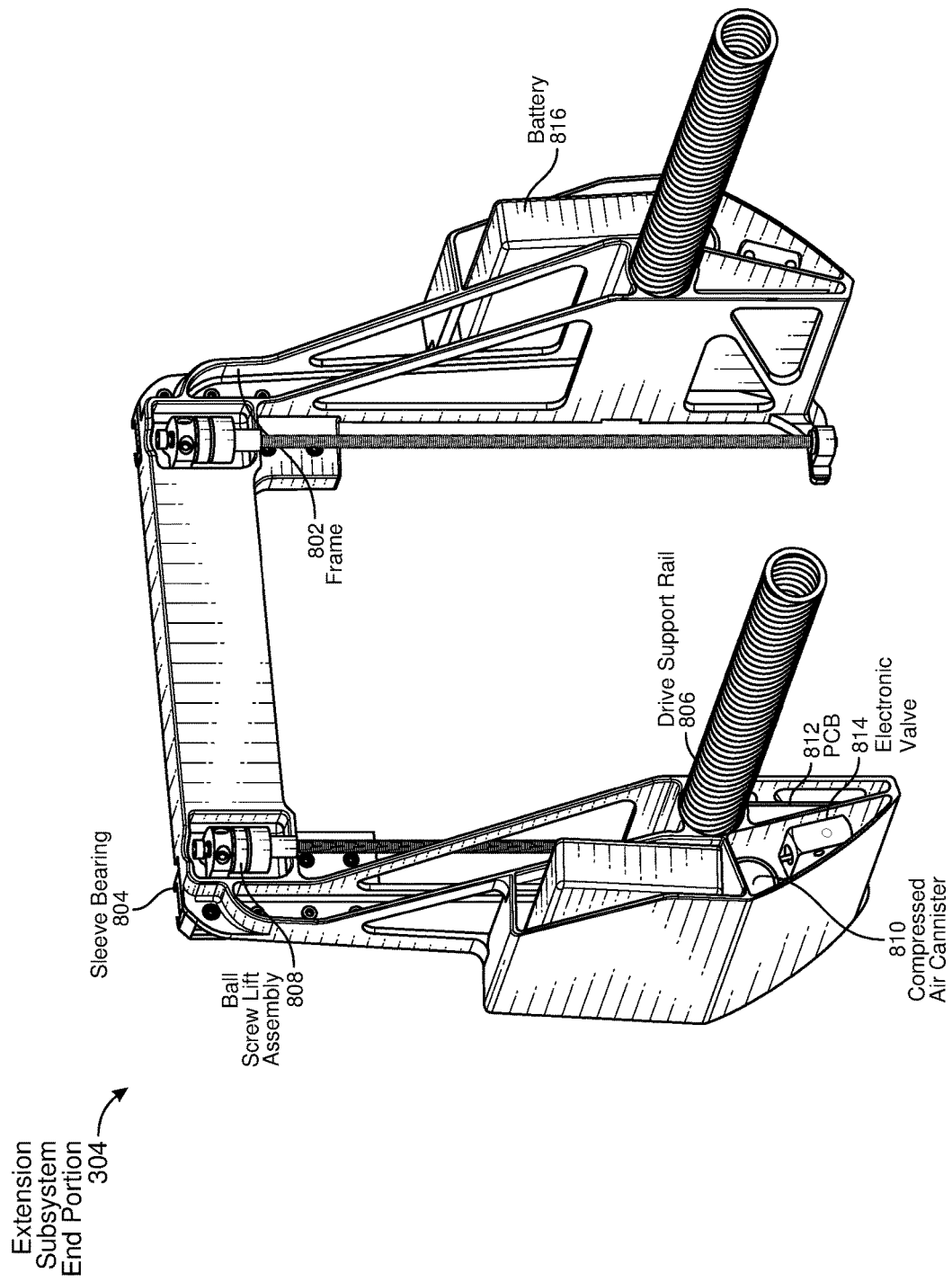
FIG. 8 is a perspective view of an exemplary extension subsystem end portion employable in the systems of FIGS. 2 and 3.

FIG. 8 is a perspective view of an exemplary extension subsystem end portion 304. In some embodiments, extension subsystem end portion 304 may include a frame 802 to which a corresponding drive subsystem end portion 302 may be securely connected (e.g., by way of drive support rail 806, which may be attached to, or represent part of, telescoping assembly 416). Frame 802, in some examples, may provide spaces in which various components for operating and controlling robotic system 300 (e.g., printed circuit board (PCB) 812 for carrying a processor and other electronic devices, battery 816 for providing power, and so on) are located.

In some embodiments, frame 802 may also carry compressed air contained in a compressed air canister 810, where airflow may be regulated by way of control circuitry (e.g., on PCB 812) to operate air cylinders 406 via one or more electronic valves 814 for pivoting drive wheels 402 of drive subsystem end portions 302, as described above.

To facilitate extension of rotation subsystem 306, extension subsystem end portion 304 may be slidably coupled to an end of rotation subsystem 306 by way of one or more sleeve bearings 804 that allow rotation subsystem 306 to extend upward from extension subsystem end portion 304, as well as corresponding drive subsystem end portion 302 and powerline conductor 101. To also facilitate the extension operation, extension subsystem end portion 304 may include an extension mechanism (e.g., a motor driven screw-based drive, such as a ball screw lift assembly 808) to perform the extension operation. In some examples, ball screw lift assembly 808 may be powered using one or more electric motors (not shown in FIG. 8). In operation, the electric motor may rotate a screw portion of ball screw lift assembly 808 to drive a corresponding ball nut of rotation subsystem 306 (not illustrated in FIG. 8) up or down to extend or retract rotation subsystem 306, respectively.

Figure 9:
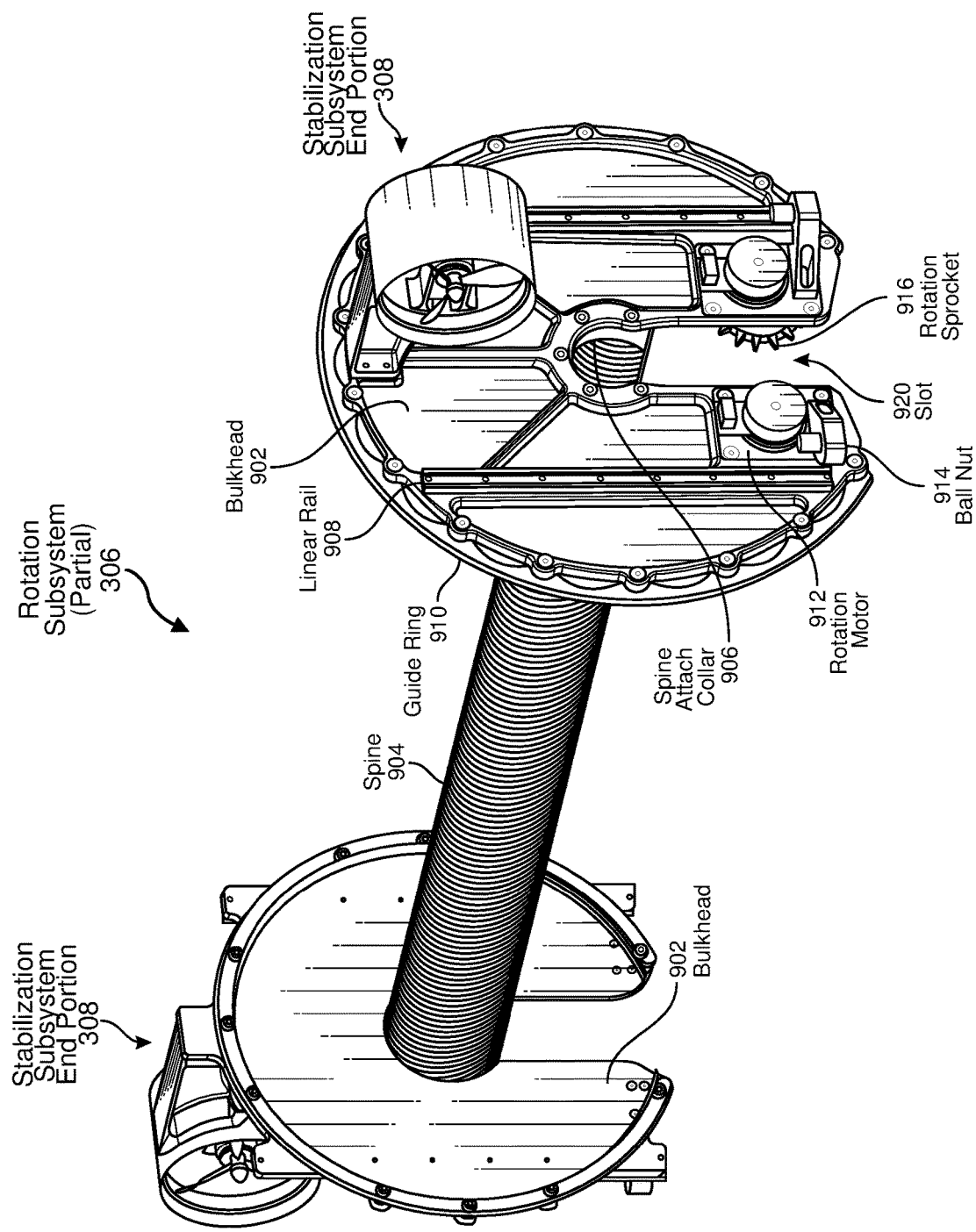
FIG. 9 is a perspective view of a partial exemplary rotation subsystem employable in the systems of FIGS. 2 and 3.

FIG. 9 is a perspective view of a portion of an exemplary rotation subsystem 306. As illustrated in FIG. 9, rotation subsystem 306 may include a spine 904 rigidly coupled at opposing ends to separate bulkheads 902 by way of spine attach collars 906. In some examples, each bulkhead 902 may define a slot 920 extending from a center location of bulkhead 902 to a periphery of bulkhead 902. Also, in some embodiments, spine 904 may be hollow and cylindrically-shaped while defining a gap that aligns with slot 920 of bulkheads 902, thus allowing rotation subsystem 306, along with the remainder of robotic system 300, to be mounted onto powerline conductor 101.

In some embodiments, each bulkhead 902 may be employed to slidably couple rotation subsystem 306 to a corresponding extension subsystem end portion 304. For example, attached to each bulkhead 902 may be one or more linear rails 908 that may slidably engage corresponding sleeve bearings 804 of extension subsystem end portion 304. Further, in some embodiments, attached to each bulkhead 902 may be one or more ball nuts 914 that rotatably engage one or more ball screw lift assemblies 808 of a corresponding extension subsystem end portion 304 such that rotation of a screw member of ball screw lift assembly 808 may cause ball nut 914 and associated bulkhead 902 to rise or descend relative to extension subsystem end portion 304, as mentioned above.

Also, in some embodiments, rotation subsystem 306 may include a guide ring 910 attached to a periphery of each bulkhead 902, where a portion of payload attachment hardware 1000, described below in conjunction with FIG. 10, engages with guide rings 910 to facilitate rotation of payload attachment hardware 1000 about spine 904 and powerline conductor 101. Also, in some examples, rotation subsystem 306 may include one or more rotation sprockets 916, driven by one or more rotation motors 912, to engage with payload attachment hardware 1000 to rotate payload attachment hardware 1000 and a segment of fiber optic cable 112 about powerline conductor 101. In some embodiments, only one bulkhead 902 may include one or more rotation sprockets 916 and associated rotation motors 912, such as in the examples of FIG. 9 in which spine 904 is rigidly connected to bulkheads 902. In other examples, such as those in which spine 904 is not present in rotation subsystem 306 (e.g., when bulkheads 902 are coupled to each other only through payload attachment hardware 1000), both bulkheads 902 may include one or more rotation sprockets 916 and associated rotation motors 912 to rotate payload attachment hardware 1000.

Also coupled to rotation subsystem 306, at each bulkhead 902, may be a corresponding stabilization subsystem end portion 308. In some embodiments, stabilization subsystem end portion 308 may include one or more position stabilizers, such as thrusters (e.g., propellers). In some examples, the position stabilizer may be activated to maintain rotation subsystem 306 in an upright orientation (e.g., as shown in FIG. 9). Also, in some embodiments, rotation subsystem 306 may include one or more sensors (e.g., gravity sensors) upon which operation of the position stabilizers are based. In some examples, other types of position stabilizers other than thrusters (e.g., weight-shifting systems) may be employed in other embodiments.

In the particular example of FIG. 9, a single bidirectional thruster is employed for each stabilization end portion 308 such that the force applied by each thruster may be reversed by reversing the direction of rotation. In one example, the thrusters may be controlled to generate thrust in the same direction at the same time. In such an example, the thrusters may exhibit opposite blade pitches, but may be driven in opposing directions at the same time so that they generate thrust in the same direction, thus possibly causing their opposing lateral forces to cancel. Moreover, the direction in which both thrusters are rotating may be reversed simultaneously to reverse the direction of thrust. In another embodiment, the thrusters may be configured to generate thrust in opposing directions simultaneously, with the overall force applied to system 300 being determined by the relative rotational speed, and thus the relative thrust, of each thruster. Other thruster arrangements and control strategies using one or more thrusters may be employed in other embodiments.

Figure 10:
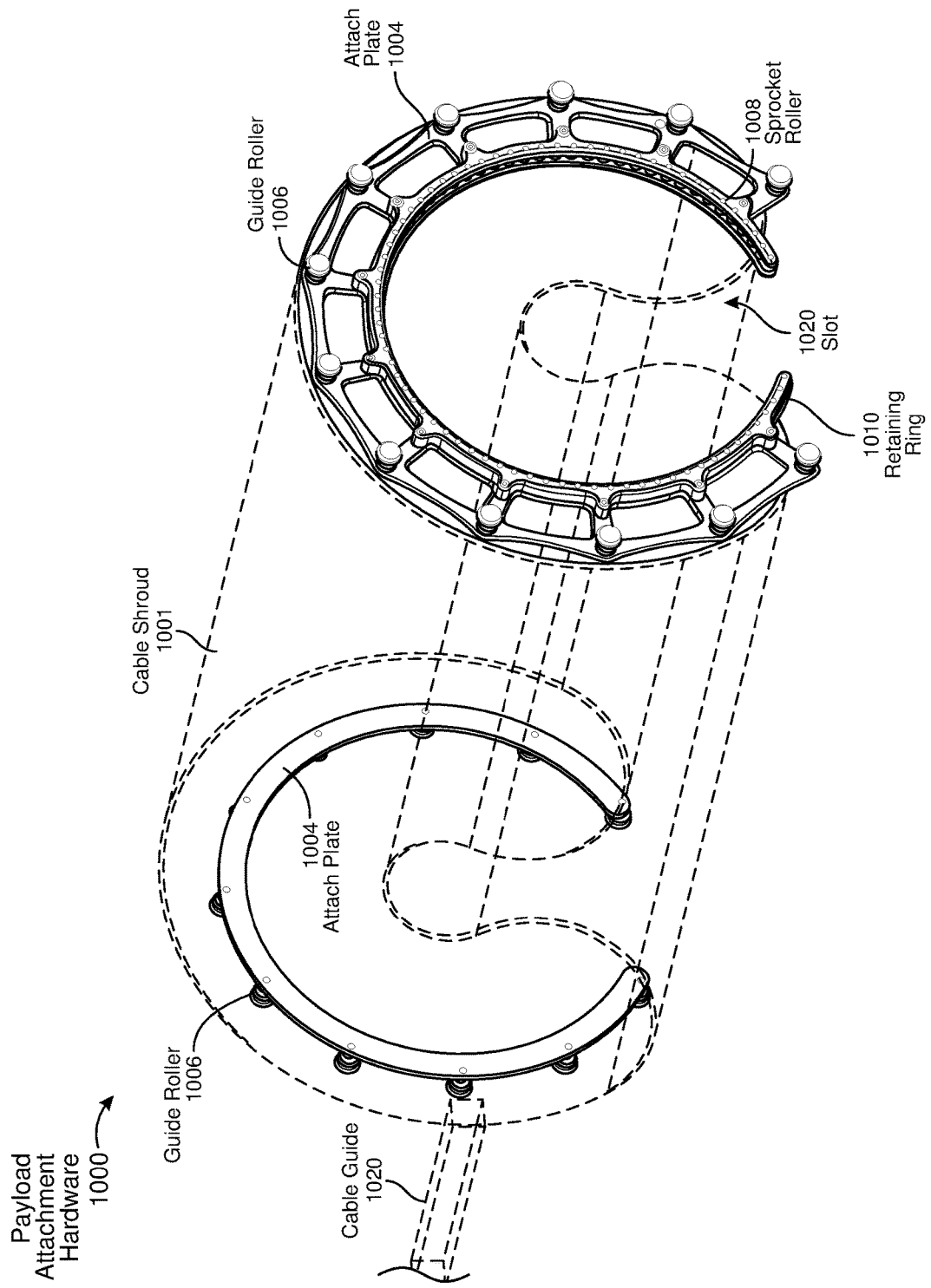
FIG. 10 is a perspective view of exemplary payload attachment hardware employable with the partial exemplary rotation subsystem of FIG. 9.

FIG. 10 is a perspective view of payload attachment hardware 1000, mentioned above. In some embodiments, payload attachment hardware 1000 may include a cable shroud 1001, within which the segment of fiber optic cable 112 to be installed is stored. In some examples, the segment of fiber optic cable 112 may be installed on a spool or other component that facilitates the paying out of fiber optic cable 112 via a cable guide 1020 as rotation subsystem 306 causes payload attachment hardware 1000 to rotate about powerline conductor 101. While FIG. 10 depicts cable guide 1020 as a simple passive guide, other types of cable guides may include other types of structures, including more active subsystems that impart controlled tension onto fiber optic cable 112 as it is installed. In yet other embodiments, the segment of fiber optic cable 112 may not reside on a spool or similar device. In some examples, cable shroud 1001 may include an access door or port to facilitate placement of the segment of fiber optic cable 112 into cable shroud 1001 prior to installation.

At each end of payload attachment hardware 1000, in some embodiments, an attach plate 1004 may be installed to which multiple guide rollers 1006 are rotatably coupled. Guide rollers 1006 may be configured to engage guide ring 910 of rotation subsystem 306 to facilitate rotation of payload attachment hardware 1000 relative to the remainder of rotation subsystem 306, as well as powerline conductor 101. Further, in some examples, payload attachment hardware 1000 may include a retaining ring 1010 (e.g., connected to retainer plate 1004) that holds a plurality of sprocket rollers 1008 aligned therein to be engaged by rotation sprockets 916 (FIG. 9) to provide a force for rotating payload attachment hardware 1000. In examples in which rotation sprockets 916 and corresponding rotation motors 912 are installed at both ends of rotation subsystem 306, payload attachment hardware 1000 may include retaining rings 1010 and sprocket rollers 1008 at both ends as well.

Figure 11:
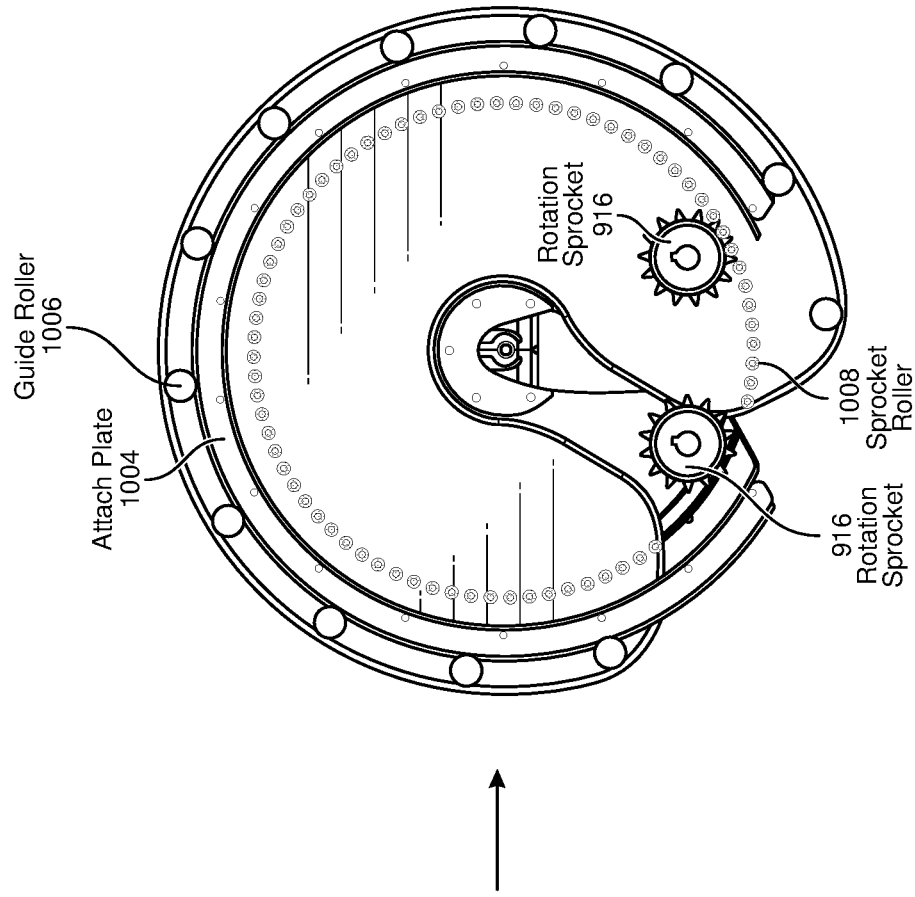
FIG. 11 includes end views of portions of the partial rotation subsystem and payload attachment hardware of FIGS. 9 and 10, respectively.
Figure 11:
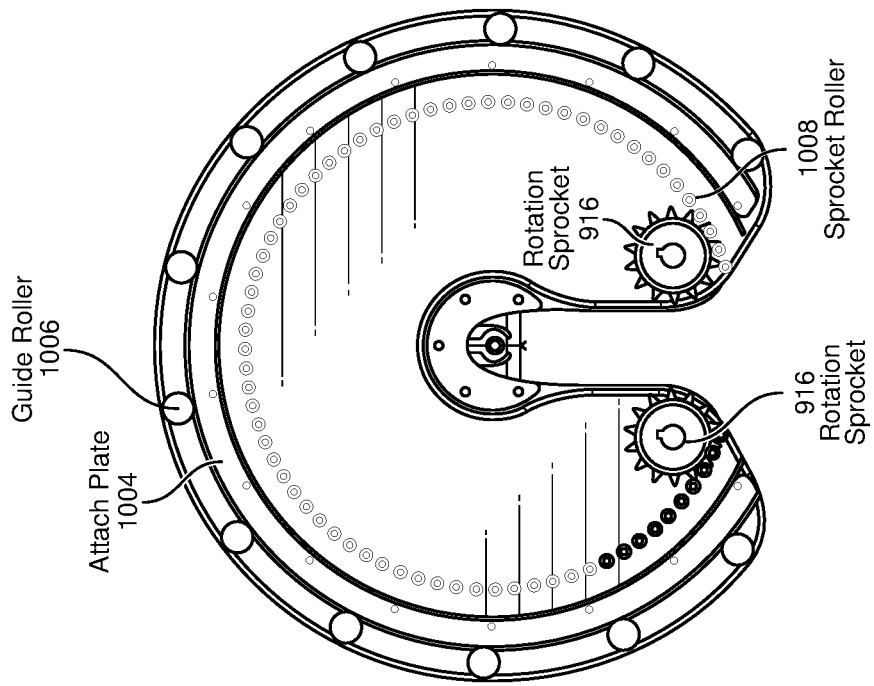

As shown in FIG. 10, in some embodiments, each end of cable shroud 1001 may define a slot 1020 configured to align with the corresponding slot 920 of bulkheads 902 of FIG. 9 to facilitate loading of robotic system 300 onto powerline conductor 101. Additionally, as rotation subsystem 306 rotates payload attachment hardware 1000 about powerline conductor 101, at least one rotation sprocket 916 may maintain contact with sprocket rollers 1008 to continue rotating payload attachment hardware 1000. FIG. 11 includes end views of payload attachment hardware 1000 superimposed with end views of associated rotation subsystem 306 to illustrate such a configuration. For example, in the left-hand end view of FIG. 11, slot 1020 of payload attachment hardware 1000 is oriented to align with the corresponding slot 920 of bulkhead 902. At that point, both rotation sprockets 916 may engage sprocket rollers 1008 to rotate payload attachment hardware 1000. The right-hand view illustrates an angle of rotation (e.g., approximately 30 degrees) of payload attachment hardware 1000 from the vertically-oriented left-hand view, resulting in slot 1020 being aligned with a first (e.g., leftmost) rotation sprocket 916, thus causing that rotation sprocket 916 to lose contact with sprocket rollers 1008, while a second rotation sprocket 916 continues to make contact with sprocket rollers 1008. As rotation continues, both rotation sprockets 916 may engage sprocket rollers 1008 simultaneously until second rotation sprocket 916 disengages from sprocket rollers 1008 while first rotation sprocket 916 maintains such contact.

Figure 12:
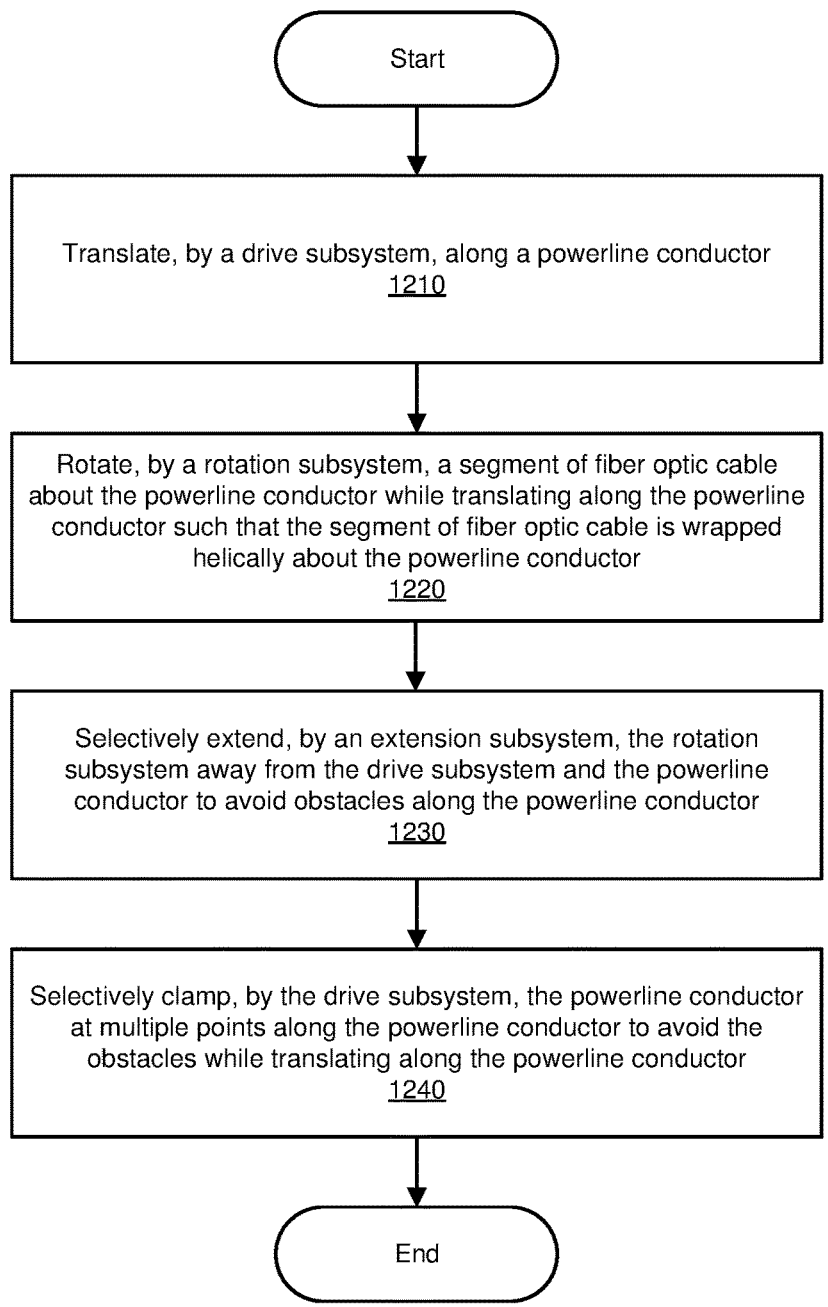
FIG. 12 is a flow diagram of an exemplary method for installing a fiber optic cable on a powerline conductor.

FIG. 12 is a flow diagram of an exemplary method 1200 for installing fiber optic cable (e.g., fiber optic cable 112) onto a powerline conductor (e.g., powerline conductor 101). The steps shown in FIG. 12 may be performed by any suitable system, including robotic systems 200 and 300 illustrated in FIGS. 2 and 3, as described above. In one example, each of the steps shown in FIG. 12 may represent an algorithm executed by a controller or processor, where that algorithm includes and/or is represented by multiple sub-steps, examples of which are described in greater detail above.

As illustrated in FIG. 12, at step 1210, one or more of the systems described herein may translate, by a drive subsystem (e.g., drive subsystem 202), along a powerline conductor (e.g., powerline conductor 101). At step 1220, a rotation subsystem (e.g., rotation subsystem 206) may rotate a segment of fiber optic cable (e.g., fiber optic cable 112) about the powerline conductor while translating along the powerline conductor such that the segment of fiber optic cable is wrapped helically about the powerline conductor. At step 1230, an extension subsystem (e.g., extension subsystem 204) may selectively extend the rotation subsystem away from the drive subsystem and the powerline conductor to avoid obstacles along the powerline conductor. Optionally, at step 1240, the drive subsystem may selectively clamp the powerline conductor at multiple points along the powerline conductor to avoid obstacles while translating along the powerline conductor.

Figure 13:
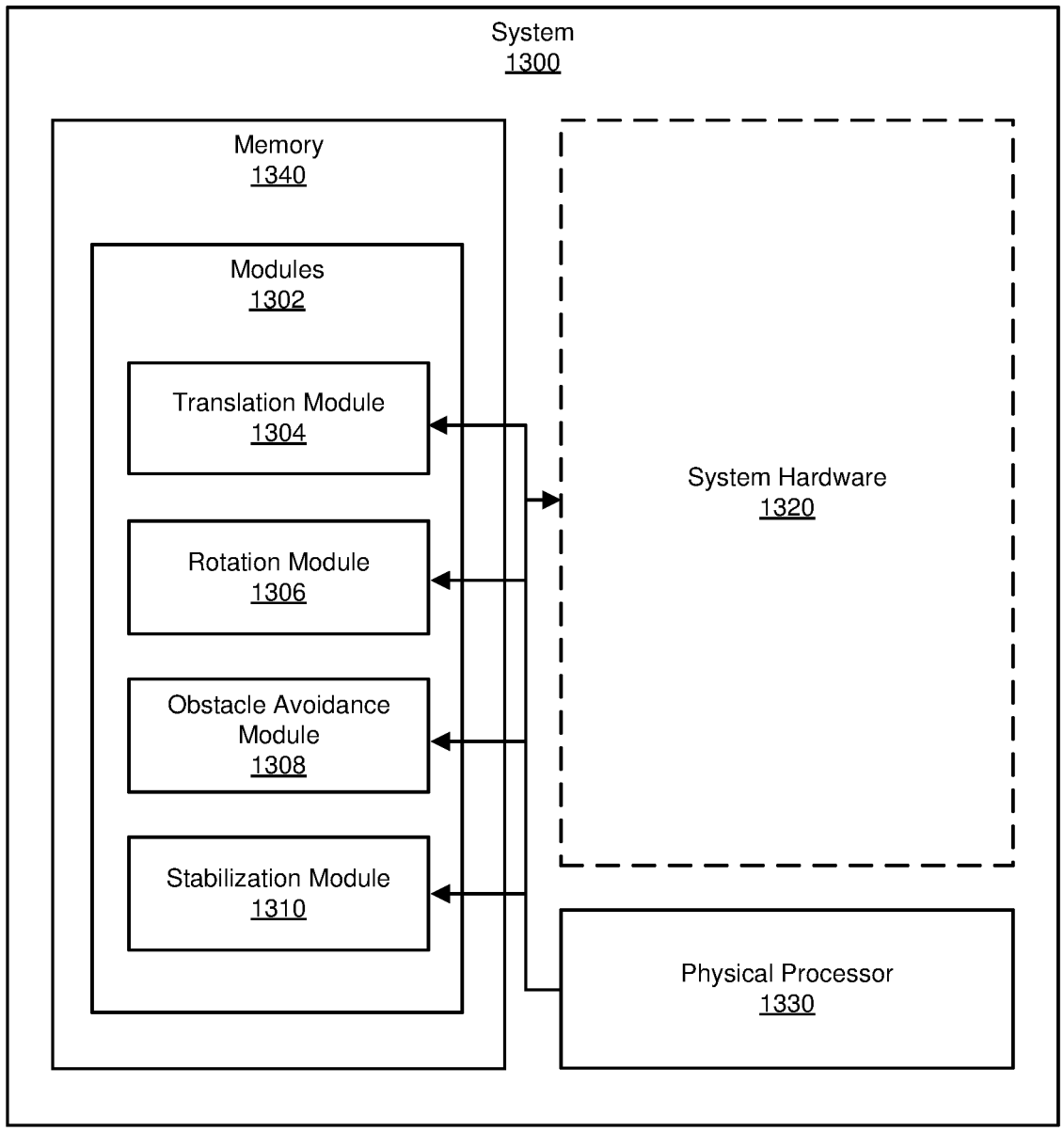
FIG. 13 is a block diagram of an exemplary system for installing a fiber optic cable on a powerline conductor.

FIG. 13 is a block diagram of an exemplary system 1300 (e.g., serving as robotic systems 200 and 300) for installing fiber optic cable 112 onto powerline conductor 101. As depicted in FIG. 13, system 1300 may include a memory 1340 storing various modules 1302 executable by one or more physical processors 1330 for causing or controlling various operations of system 1300. In performing these operations, modules 1302 may communicate with system hardware 1320 (e.g., drive subsystem 202, extension subsystem 204, rotation subsystem 206, and/or stabilization subsystem 208, as described above) (e.g., such as by way of wired connections to drive motors 408, electronic valves 814, rotation motors 918, and so on). Further, in some examples, system hardware 1320 may include communication circuitry (e.g., a wireless transceiver) to facilitate reception of commands (e.g., from a human operator) to control various portions of system 1300, as mentioned above.

Modules 1302 may include a translation module 1304, a rotation module 1306, an obstacle avoidance module 1308, and/or a stabilization module 1310. In some embodiments, translation module 1304 may operate drive subsystem end portions 302 to translate system 1300 along powerline conductor 101 (e.g., by way of operating one or more drive motors 408). In some examples, rotation module 1306 may operate rotation subsystem 306 to rotate a segment of fiber optic cable 112 about powerline conductor 101 (e.g., by way of operating one or more rotation motors 912). Further, in some embodiments, obstacle avoidance module 1308 may operate extension subsystem end portions 304 to extend rotation subsystem 306 away from powerline conductor 101 (e.g., via operating one or more ball screw lift assemblies 808 or other extension assemblies) to avoid obstacles along powerline conductor 101. Moreover, obstacle avoidance module 1308 may operate drive subsystem end portions 302 to selectively engage and/or release powerline conductor 101 (e.g., via operating one or more electronic valves 814 to cause separate pairs of drive wheels 402 to clamp and/or release powerline conductor 101). In some embodiments, stabilization module 1310 may control stabilization subsystem end portions 308 to stabilize an orientation of system 1300 about powerline conductor 101 (e.g., by way of operating one or more thrusters or other force-generating mechanism). In some examples, stabilization module 1310 may perform such operations on a consistent basis or may limit such operations to those times during which rotation subsystem 306 is in a partial or complete extension position provided by extension subsystem end portions 304.

As discussed above in conjunction with FIGS. 1-13, systems and methods described herein may facilitate automatic or semiautomatic installation of significant lengths of fiber optic cable onto a powerline conductor (e.g., by helical wrapping) while avoiding one or more obstacles (e.g., insulators, taps, and/or the like) along the powerline conductor. Such capabilities may result in accelerated and reliable installation of fiber optic cable in underserved geographical areas by way of preexisting power transmission and/or distribution infrastructure.

EXAMPLE EMBODIMENTS

Example 1: A system may include (1) a drive subsystem that translates along a powerline conductor, (2) a rotation subsystem that rotates a segment of fiber optic cable about the powerline conductor while the drive subsystem translates along the powerline conductor such that the segment of fiber optic cable is wrapped helically about the powerline conductor, and (3) an extension subsystem that (a) mechanically couples the rotation subsystem to the drive subsystem, and (b) selectively extends the rotation subsystem away from the drive subsystem and the powerline conductor to avoid obstacles along the powerline conductor.

Example 2: The system of Example 1, where an orientation of the extension subsystem relative to the drive subsystem may remain constant as the rotation subsystem rotates the segment of fiber optic cable about the powerline conductor.

Example 3: The system of either Example 1 or Example 2, where the extension subsystem may selectively extend the rotation subsystem linearly upward away from the drive subsystem and the powerline conductor.

Example 4: The system of either Example 1 or Example 2, where the drive subsystem may include (1) a first end portion at a first end of the system, and (2) a second end portion at a second end of the system opposite the first end.

Example 5: The system of Example 4, where each of the first end portion and the second end portion may include a plurality of engaging components that engage the powerline conductor, where the plurality of engaging components further include (1) a first pair of the engaging components that selectively clamp the powerline conductor therebetween, and (2) a second pair of the engaging components that selectively clamp the powerline conductor therebetween, where at least one of the first pair or the second pair clamp the powerline conductor therebetween as the drive subsystem translates along the powerline conductor.

Example 6: The system of Example 5, where (1) during a first time period, the first pair of the engaging components may be spread apart to allow passage of an obstacle therebetween while the second pair of the engaging components clamp the powerline conductor therebetween, (2) during a second time period after the first time period, the first pair of the engaging components may clamp the powerline conductor therebetween and the second pair of the engaging components may clamp the powerline conductor therebetween while the first pair and the second pair are located on opposing sides of the obstacle, and (3) during a third time period after the second time period, the second pair of the engaging components may be spread apart to allow passage of the obstacle therebetween while the first pair of the engaging components clamp the powerline conductor therebetween.

Example 7: The system of Example 6, where during a subsequent time period after the first time period, the first pair of the engaging components may clamp the powerline conductor therebetween and the second pair of the engaging components may clamp the powerline conductor therebetween after the first pair and the second pair have passed the obstacle.

Example 8: The system of Example 6, where during a previous time period prior to the first time period, the first pair of the engaging components may clamp the powerline conductor therebetween and the second pair of the engaging components may clamp the powerline conductor therebetween before the first pair and the second pair encounter the obstacle.

Example 9: The system of Example 5, where at least one of the first pair of the engaging components or the second pair of the engaging components may rotate about vertical axes in opposing directions.

Example 10: The system of Example 5, where at least one of the first pair of the engaging components or the second pair of the engaging components may selectively clamp the powerline conductor at any of a range of angles at which the powerline conductor lies relative to a longitudinal axis of the drive subsystem.

Example 11: The system of Example 4, where the extension subsystem may include (1) a first end portion directly connected to the first end portion of the drive subsystem, and (2) a second end portion directly connected to the second end portion of the drive subsystem.

Example 12: The system of Example 11, where each of the first end portion and the second end portion of the extension subsystem may include (1) a frame mechanically coupled to the corresponding end portion of the drive subsystem, and (2) at least one extension mechanism that mechanically couples the rotation subsystem to the frame and selectively extends the rotation subsystem away from the drive subsystem by any of a range of distances.

Example 13: The system of Example 12, where the extension mechanism may include a motor-driven screw-based drive.

Example 14: The system of Example 11, where (1) the rotation subsystem may include (a) a first end portion coupled to the first end portion of the extension subsystem, and (b) a second end portion coupled to the second end portion of the extension subsystem, and (2) the rotation subsystem may fixably couple the first end portion of the extension subsystem to the second end portion of the extension subsystem.

Example 15: The system of Example 14, where the rotation subsystem may further include (1) a stationary portion that includes the first portion end and the second end portion of the rotation subsystem, and (2) a rotating portion that is rotatably coupled to the stationary portion and carries the segment of fiber optic cable.

Example 16: The system of Example 15, where the stationary portion and the rotating portion collectively may define a slot extending from an exterior of the rotation subsystem to a longitudinal axis of the rotation subsystem about which the rotating portion rotates.

Example 17: The system of either Example 1 or Example 2, where the system may further include a stabilization subsystem, coupled to the rotation subsystem, that maintains a desired position of the rotation subsystem relative to the powerline conductor.

Example 18: A system may include (1) a drive subsystem that translates along a powerline conductor, where the drive subsystem includes a leading portion and a trailing portion, (2) a rotation subsystem that rotates a segment of fiber optic cable about the powerline conductor while the drive subsystem translates along the powerline conductor such that the segment of fiber optic cable is wrapped helically about the powerline conductor, and (3) an extension subsystem that (a) mechanically couples the rotation subsystem to the leading portion and the trailing portion of the drive subsystem, and (b) selectively extends the rotation subsystem transversely from a longitudinal axis joining the leading portion and the trailing portion of the drive subsystem, and from the powerline conductor, to avoid obstacles along the powerline conductor.

Example 19: A method may include (1) translating, by a drive subsystem, along a powerline conductor, (2) rotating, by a rotation subsystem, a segment of fiber optic cable about the powerline conductor while translating along the powerline conductor such that the segment of fiber optic cable is wrapped helically about the powerline conductor, and (3) selectively extending, by an extension subsystem that mechanically couples the rotation subsystem to the drive subsystem, the rotation subsystem away from the drive subsystem and the powerline conductor to avoid obstacles along the powerline conductor.

Example 20: The method of Example 19, where the method may further include selectively clamping, by the drive subsystem, the powerline conductor at multiple points along the powerline conductor to avoid the obstacles while translating along the powerline conductor.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more modules recited herein may receive data (e.g., data from one or more sensors detecting obstacles, system orientation, and so on) and control the operations of various portions of the system (e.g., the drive, rotation, extension, and/or stabilization subsystems) based on that data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    upon reaching an obstacle while translating along a powerline conductor:
        controlling a drive subsystem to unclamp at least two leading drive wheels of an automated cable installing system; and
        controlling an extension subsystem to extend a rotation subsystem of the automated cable installing system away from the powerline conductor;
    upon translating past the obstacle with the leading drive wheels:
        controlling at least two trailing drive wheels to unclamp the trailing drive wheels; and
        controlling the drive subsystem to re-clamp the leading drive wheels; and
    upon translating past the obstacle with the trailing drive wheels:
        controlling the drive subsystem to re-clamp the trailing drive wheels; and
        controlling the extension subsystem to retract the rotation subsystem toward the powerline conductor.

2. The method of claim 1, wherein an orientation of the extension subsystem relative to the drive subsystem remains constant as the rotation subsystem rotates a segment of fiber optic cable about the powerline conductor.

3. The method of claim 1, wherein the extension subsystem selectively extends the rotation subsystem linearly upward away from the drive subsystem and the powerline conductor.

4. The method of claim 1, wherein the drive subsystem includes one or more engaging components that engage the powerline conductor.

5. The method of claim 4, wherein the one or more engaging components selectively clamp the powerline conductor as the drive subsystem translates along the powerline conductor.

6. The method of claim 5, further comprising:
    during a first time period, spreading apart a first pair of engaging components to allow passage of the obstacle therebetween while a second pair of the engaging components clamp the powerline conductor therebetween;
    during a second time period after the first time period, clamping the powerline conductor using the first pair of the engaging components; and
    during a third time period after the second time period, spreading apart a second pair of the engaging components to allow passage of the obstacle therebetween while the first pair of the engaging components clamps the powerline conductor therebetween.

7. The method of claim 6, wherein during a subsequent time period after the first time period, the first pair of the engaging components clamps the powerline conductor therebetween and the second pair of the engaging components clamps the powerline conductor therebetween after the first pair and the second pair have passed the obstacle.

8. The method of claim 6, wherein during a previous time period prior to the first time period, the first pair of the engaging components clamps the powerline conductor therebetween and the second pair of the engaging components clamps the powerline conductor therebetween before the first pair and the second pair encounter the obstacle.

9. The method of claim 5, wherein at least one of the first pair of the engaging components or the second pair of the engaging components rotates about vertical axes in opposing directions.

10. The method of claim 5, wherein at least one of the first pair of the engaging components or the second pair of the engaging components selectively clamps the powerline conductor at any of a range of angles at which the powerline conductor lies relative to a longitudinal axis of the drive subsystem.

11. A method comprising:
    upon reaching an obstacle while translating along a powerline conductor:
        unclamping at least two leading drive wheels of a drive subsystem of an automated cable installing system; and
        extending a rotation subsystem of the automated cable installing system away from the powerline conductor;
    upon translating past the obstacle with the leading drive wheels:
        unclamping at least two trailing drive wheels; and
        re-clamping the leading drive wheels; and
    upon translating past the obstacle with the trailing drive wheels:
        re-clamping the trailing drive wheels; and
        retracting the rotation subsystem toward the powerline conductor.

12. The method of claim 11, wherein an orientation of the extension subsystem relative to the drive subsystem remains constant as the rotation subsystem rotates a segment of fiber optic cable about the powerline conductor.

13. The method of claim 11, wherein the extension subsystem selectively extends the rotation subsystem linearly upward away from the drive subsystem and the powerline conductor.

14. The method of claim 11, wherein the drive subsystem includes one or more engaging components that engage the powerline conductor.

15. The method of claim 14, wherein the one or more engaging components selectively clamp the powerline conductor as the drive subsystem translates along the powerline conductor.

16. The method of claim 15, further comprising:

during a first time period, spreading apart a first pair of engaging components to allow passage of the obstacle therebetween while a second pair of the engaging components clamp the powerline conductor therebetween;

during a second time period after the first time period, clamping the powerline conductor using the first pair of the engaging components; and during a third time period after the second time period, spreading apart a second pair of the engaging components to allow passage of the obstacle therebetween while the first pair of the engaging components clamps the powerline conductor therebetween.

17. The method of claim 16, wherein during a subsequent time period after the first time period, the first pair of the engaging components clamps the powerline conductor therebetween and the second pair of the engaging components clamps the powerline conductor therebetween after the first pair and the second pair have passed the obstacle.

18. The method of claim 16, wherein during a previous time period prior to the first time period, the first pair of the engaging components clamps the powerline conductor therebetween and the second pair of the engaging components clamps the powerline conductor therebetween before the first pair and the second pair encounter the obstacle.

19. The method of claim 15, wherein at least one of the first pair of the engaging components or the second pair of the engaging components rotates about vertical axes in opposing directions.

20. A non-transitory computer-readable medium comprising one or more computer-executable instructions that, when executed by at least one controller, cause the controller to perform the following:

upon reaching an obstacle while translating along a powerline conductor:
controlling a drive subsystem to unclamp at least two leading drive wheels of an automated cable installing system; and
controlling an extension subsystem to extend a rotation subsystem of the automated cable installing system away from the powerline conductor;

upon translating past the obstacle with the leading drive wheels:
controlling at least two trailing drive wheels to unclamp the trailing drive wheels; and
controlling the drive subsystem to re-clamp the leading drive wheels; and upon translating past the obstacle with the trailing drive wheels:
controlling the drive subsystem to re-clamp the trailing drive wheels; and
controlling the extension subsystem to retract the rotation subsystem toward the powerline conductor.

* * * * *